Feb. 13, 1945.  C. D. BUCK  2,369,528
MOTION TRANSMITTING MECHANISM
Filed Aug. 25, 1943  3 Sheets-Sheet 1

Clyde D. Buck INVENTOR.
BY
A. H. Burns

Feb. 13, 1945.  C. D. BUCK  2,369,528
MOTION TRANSMITTING MECHANISM
Filed Aug. 25, 1943   3 Sheets-Sheet 2
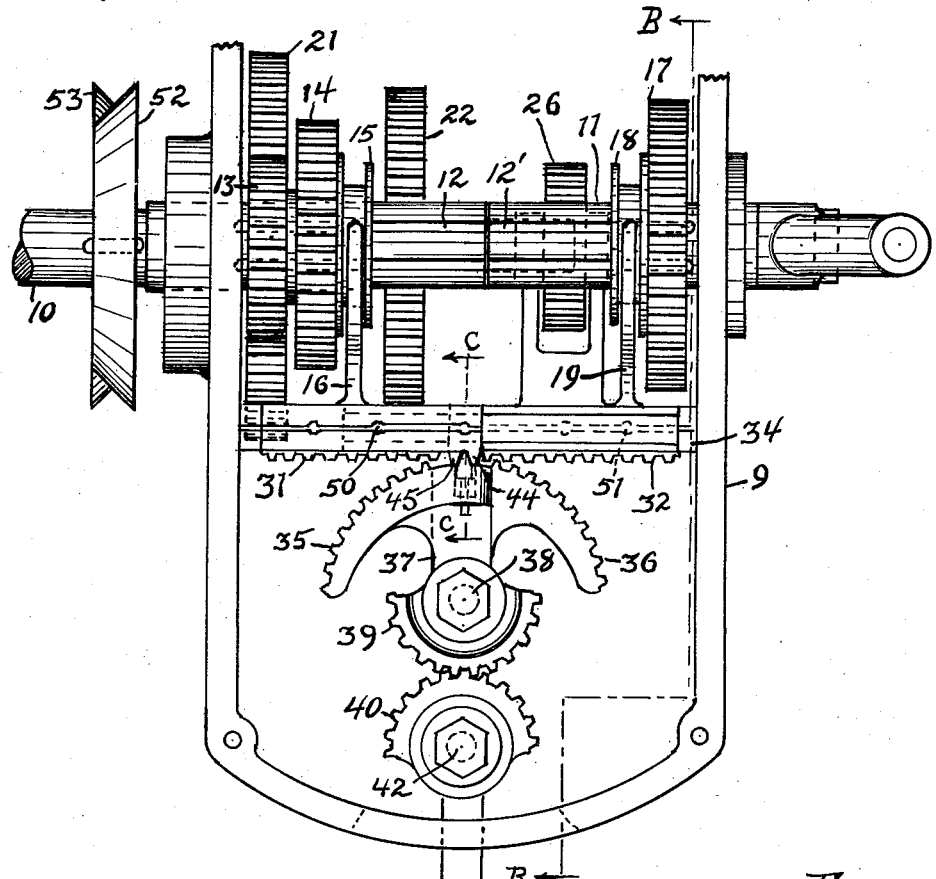
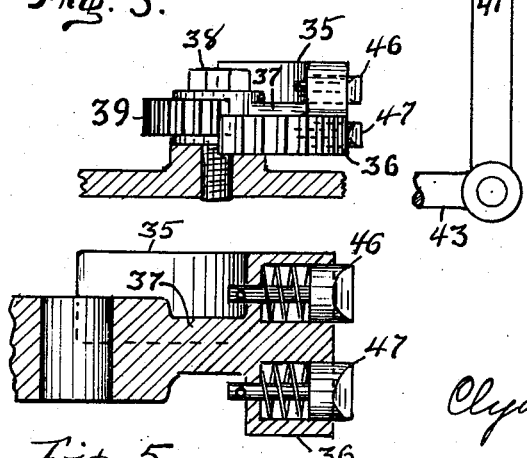
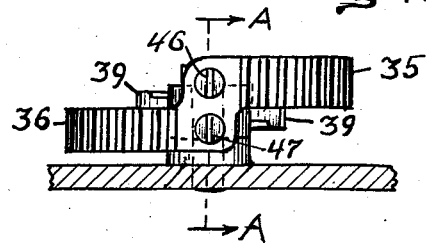
Clyde D. Buck INVENTOR.
BY Feb. 13, 1945. C. D. BUCK 2,369,528
MOTION TRANSMITTING MECHANISM
Filed Aug. 25, 1943 3 Sheets-Sheet 3
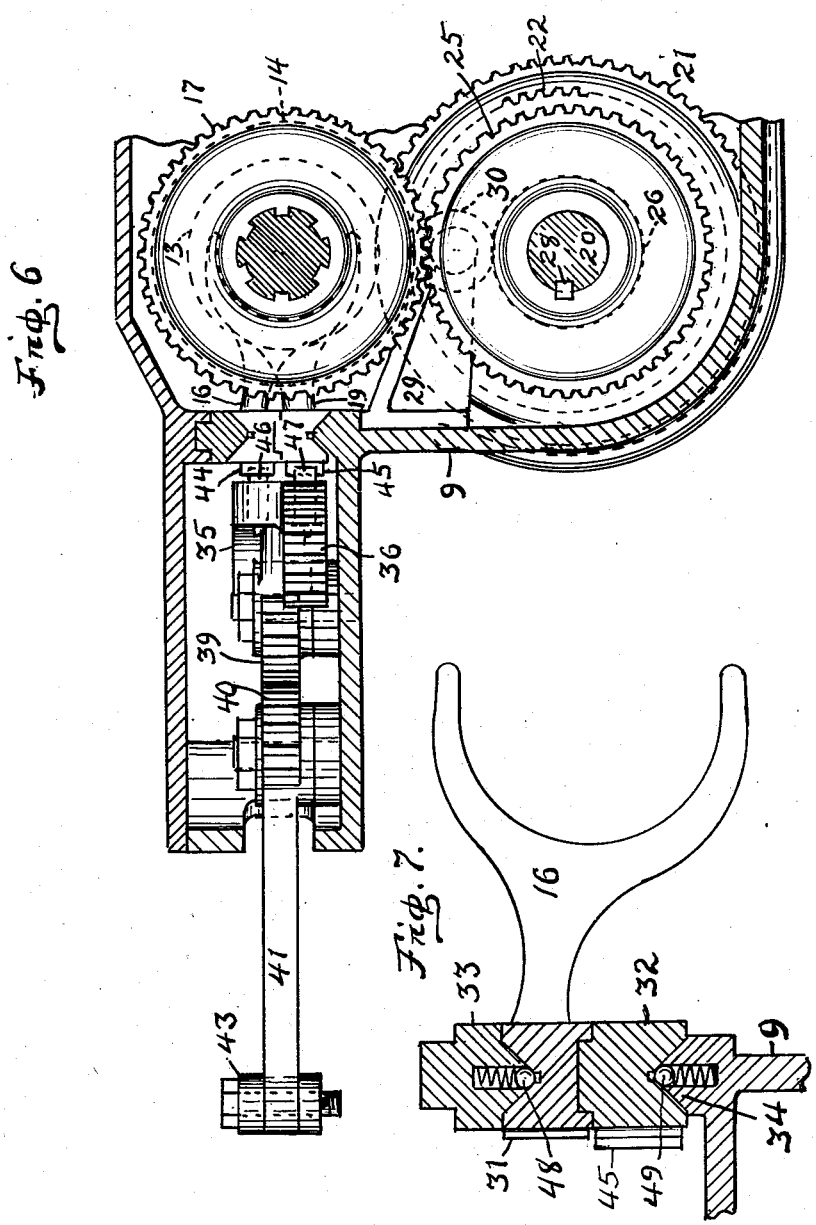
Clyde D. Buck INVENTOR.
BY H. G. Burns Patented Feb. 13, 1945

2,369,528

UNITED STATES PATENT OFFICE 2,369,528

MOTION TRANSMITTING MECHANISM

Clyde D. Buck, Fremont, Ind.

Application August 25, 1943, Serial No. 499,910

6 Claims. (Cl. 74—473)

This invention relates to improvements in motion transmitting mechanism of the variable speed type used generally in power driven vehicles.

Ordinarily, the speed change gearing used in power transmission for automobiles is controlled by a shift gear lever that requires maneuvering forwardly, backwardly and laterally and subsequent forward and backward adjustment of the lever in order to adjust the various gears into a desired relation with each other. Such arrangement results in more or less confusion in effecting the various speed changes, especially when shifting from one gear adjustment to another.

One of the objects of the invention is to provide a speed change gearing and a control means therefor including a lever that is movable in a direct course from one extreme point to another, effecting movement of the gears into different engaging arrangements with each other to effect the speed changes between the driving and driven elements without maneuvering the control lever as in the usual practice variously into several planes.

Another object of the invention is to provide a speed change gearing for a power driven vehicle that is simple in construction and easily manipulated.

Other objects and advantages of the invention appear in the following description.

An illustrative embodiment of the invention is shown in the accompanying drawings, in which:

Fig. 2 is a fragmentary top plan view of the gear mechanism and the gear shifting means therefor;

Fig. 3 is a detail side elevational view of an articulating gear member forming a part of the gear shifting means;

Fig. 4 is another detail view of the structure shown in Fig. 3 in a vertical plane at right angles thereto;

Fig. 5 is a fragmentary view showing a vertical section of Fig. 4 on the line A—A thereof, drawn to a larger scale;

Fig. 6 is an end elevational view of the structure shown in Fig. 2, portions being in section on the line B—B thereof; and Fig. 7 is a detail elevational view showing a section through rack-bars and associated parts of the structure, the section being on the line C—C of Fig. 2.

Figure 1:
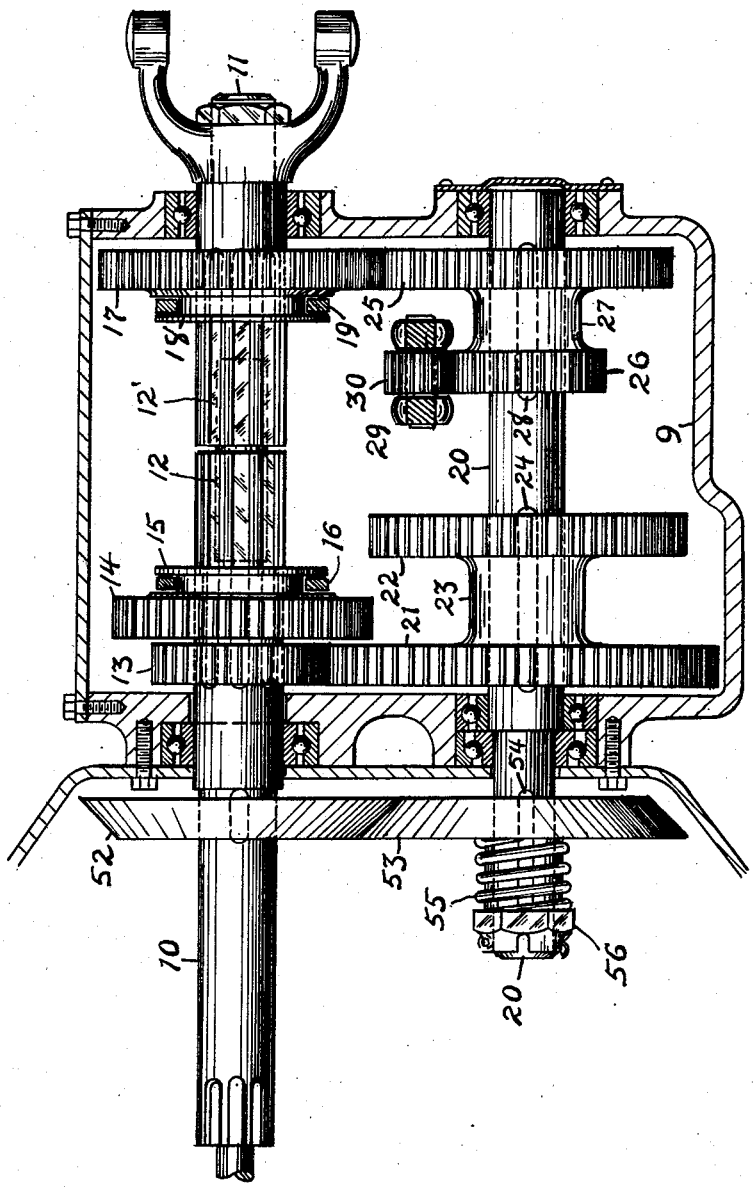
Fig. 1 is a side elevational view of a gear mechanism forming part of the invention, portions being in section.

The illustrative embodiment of the invention consists of a speed change gearing mounted in a housing arranged for connection between an engine and the traction mechanism of a vehicle (not shown). The power transmission mechanism here disclosed includes a housing 9 in which is mounted a drive-shaft 10 in axial alinement with a driven shaft 11. The inner end of the drive-shaft 10 has longitudinal splines 12 and upon the splined end of the drive-shaft are disposed step gears 13 and 14 provided with an annularly grooved hub 15 that is engaged by a gear shifting fork 16. The inner end of the driven shaft 11 also has splines 12' and on which is longitudinally movable a driven gear 17 provided with an annularly grooved hub 18 engaged by another gear shifting fork 19.

Within the housing 9 is journaled a countershaft 20 upon which are mounted another pair of step gears 21 and 22 having a common hub 23 secured to the countershaft by a key 24. And another pair of step gears 25 and 26 having a common hub 27 is secured upon said countershaft by a key 28. The step gears 13 and 14 have engagement selectively with the companion step gears 21 and 22, or disengaged therefrom, according to adjustment of the fork 16. Or, upon shifting the gears 13 and 14 so their hub 15 encompasses the abutting splined ends of both the drive-shaft and the driven shaft, motion is then imparted directly from one of said shafts to the other whereupon the countershaft gearing idles.

Mounted upon brackets 29 in the housing there is a reverse gear pinion 30 having constant engagement with the step gear 26, and the driven gear 17 has selective engagement with the step gear 25 and reverse gear pinion 30 according to adjustment of the fork 19.

By this arrangement the ratio of rotation with respect to the drive-shaft 10 and driven shaft 11 and the relative direction of travel is altered accordingly as the forks 16 and 19 are shifted adjustably into selected positions.

Mounted in the casing are two rack-bars 31 and 32, one overlapping the other, disposed on corresponding guide-ways 33 and 34, arranged to have movement in parallelism with the axes of the drive and driven shafts 10 and 11. The fork 16 is secured to the rack-bar 31 by which it is actuated and the fork 19 is similarly connected with the other rack-bar 32 by which it is actuated. Upon movement of said rack-bars the pair of step gears 13 and 14 or the driven gear 17 are adjustably shifted into and out of their several positions as may be desired.

An actuating mechanism is provided wherefore to actuate said rack-bars alternately, which mechanism consists of two toothed sectors 35 and 36, the sector 35 having engagement with the teeth of the rack-bar 31, and the teeth of the sector 36 having engagement with the teeth of the rack-bar 32, both of said sectors being integral with a swinging arm 37 that has movement upon the axis of a pivot bolt 38 disposed within the housing. The swinging arm has thereon a toothed segment 39 that is engaged with another gear segment 40 attached to an actuating arm 41 that has movement upon another pivot bolt 42. By this means movement is imparted selectively to the rack-bars through the medium of the sectors 35 and 36.

The actuating arm 41, by means of a coupler 43 is connected with an ordinary manually operated control lever located conveniently in the driver's compartment of the vehicle (not shown) by means of which back and forth movement is imparted to the actuating lever through the medium of the coupler at will of the driver.

To insure proper articulation between the toothed sectors and their corresponding rack-bars, the inner endmost tooth 44—45 of each rack-bar protrudes slightly beyond the other teeth so as to become engaged individually by corresponding spring-pressed fingers 46—47 located in said sectors in line with the sector teeth adjacent the inner endmost thereof. Thus, when the arm 37 is swung in one direction, the rack-bar 31 is moved into articulation with the sector 35 by the finger 46 whereupon the other finger 47 is moved out of action leaving the other rack-bar 32 stationary. In similar manner, when the arm 37 is swung in the opposite direction, the rack-bar 32 is shifted and the other rack-bar 31 is unaffected. Thus, the rack-bars are selectively shifted alternately in opposite directions and the corresponding shift gears become adjusted accordingly.

Preferably, there are provided in the guideways 33 and 34 spring-pressed detent members 48—49 that have engagement with the corresponding rack-bars 31 and 32 wherefore to yieldingly hold the rack-bars in selected positions to which they are adjusted, there being slight depressions 50—51 in said rack-bars suitably located to engage the detents.

As an aid to articulating the gears as they are shifted into engagement with other of the gears it is desirable that the countershaft be rotated simultaneously with the drive-shafts at a speed approximating that of the drive-shaft, and for this purpose there is provided friction disks 52 and 53 that are secured respectively on the drive-shaft 10 and the countershaft 20, the disk 52 being keyed on the drive-shaft, and the disk 53 being secured movably on the countershaft by a spline 54. The peripheral faces of said disks are oppositely tapered and have contact with each other, there being provided a compression spring 55, and an adjusting nut 56 threaded on the countershaft for pressing the spring against the disk 53 thus to at all times maintain frictional contact between said disks. In this manner the gears on the countershaft are rotated during shifting of the gears which thus affords better approach of one gear as it becomes engaged with another. Preferably, the pressure of one disk against the other is only sufficient as to yieldingly impart rotation of one of said disks to the other during operation of the gearing.

*Operation*

By means of the apparatus thus disclosed all of the speed change gears are shifted selectively into and out of their various engaging positions simply by movement of the operating lever in one direction, or in the opposite direction, without jockeying. This is of convenience to the operator as all of the gear shifting is readily effected by simply swinging the operating lever in opposite directions thus averting confusion.

When the shift gear element consisting of the step gears 13 and 14 and their hub 15, and the driven gear 17 with its hub are positioned as shown in Fig. 1, the gears 13 and 21 mesh while the step gear 25 meshes with the driven gear 17, so that upon rotation of the drive-shaft 10 motion is imparted to the driven shaft 11 through the medium of the meshing gears and the countershaft. When the gears are in this adjustment the driven shaft revolves in the same direction as the drive-shaft at low speed. When the driven gear 17 is moved into mesh with the reverse pinion 30 the direction of rotation of the driven shaft is reversed. While the gears 17 and 25 are in mesh, upon movement of the shift gear element out of mesh with the step gear 21 the gearing then is in neutral, and upon further movement of the shift gear element into mesh with the gear 22, the gearing then is adjusted for intermediate speed, and upon shifting said element so as to encompass the abutting splined ends of the drive-shaft and driven shaft the mechanism then is adjusted for high speed, and the countershaft gearing idles. By means of the friction disks 52 and 53 the countershaft gearing is caused to rotate during movement of either the drive or driven shafts thus facilitating movement of the several gears into mesh when shifted from one engagement into another.

Variations from the particular construction above disclosed may readily be made by exercise of engineering skill without departure from the spirit or scope of the invention, and the following claims are intended to be inclusive of such variations.

What I claim is:

1. In speed change power transmission apparatus, a drive-shaft mounted for rotation, a driven shaft abutting said drive-shaft and mounted to rotate upon a common axis therewith, the abutting end portions of said shafts having splines, a countershaft mounted for rotation and disposed parallel with said axis, a pair of step gears secured on said countershaft, a second pair of step gears secured on said countershaft, a reverse gear pinion mounted for engagement with one of said second step gears, a shift gear element splined on said drive-shaft selectively engageable with the first-mentioned step gears and said driven shaft according to adjustment of said element, a driven gear splined on said driven shaft selectively engageable with said reverse gear pinion and the other of said second step gears according to adjustment of the driven gear, and a gear shift mechanism consisting of rack-bars provided with forks engaging respectively said element and driven gear for adjustably shifting same, a swinging member provided with oppositely extending toothed sectors engageable respectively with said rack-bars wherefore to actuate said rack-bars alternately, and manually operated mechanism in connection with said swinging member to actuate same.

2. In speed change power transmission apparatus, a drive-shaft mounted for rotation, a driven shaft abutting said drive-shaft and mounted to rotate upon a common axis therewith, the abutting end portions of said shafts having splines, a counter-shaft mounted for rotation and disposed parallel with said axis, a pair of step gears secured on said countershaft, a second pair of step gears secured on said countershaft, a reverse gear pinion mounted for engagement with one of said second step gears, a shift gear element splined on said drive-shaft selectively engageable with the first-mentioned step gears and said driven shaft according to adjustment of said element, a driven gear splined on said driven shaft selectively engageable with said reverse gear pinion and the other of said second step gears according to adjustment of the driven gear, independently movable rack-bars provided with connections respectively with said shift gear element and said driven gear by which to adjust same separately, and means for moving said rack-bars selectively consisting of a member having oppositely extending toothed sectors individually engaging the respective rack-bars, the arrangement being such that by movement of said member said rack-bars are actuated singly in opposite directions.

3. In a speed change power transmission apparatus, a drive-shaft and a driven shaft mounted upon a common axis and abutting each other, a countershaft mounted to rotate upon an axis parallel with that of the other shafts, a pair of step gears keyed upon said countershaft in proximity to said drive-shaft, a second pair of step-gears keyed on said countershaft in proximity to said driven shaft, a reverse pinion mounted to have constant engagement with one of said second step gears, a driven shift gear splined on the driven shaft engageable selectively with the other of said second step gears and the reverse pinion according to adjustment thereof, a pair of shift gears splined on said drive-shaft having selective engagement with the first-mentioned pair of step gears and the driven shaft, means to adjust said driven shift gear and said pair of shift gears selectively, said means consisting of independently movable rack-bars having operative connections respectively with the driven shift gear and said pair of shift gears, and an actuating member provided with toothed sectors engaged respectively with said rack-bars so constituted that when said member is turned in one direction the corresponding rack-bar is actuated and the other is disengaged, and vice versa when turned in the opposite direction.

4. In a speed change gear mechanism, alined abutting drive and driven shafts, a countershaft mounted parallel with said shafts, a series of gears that have movement with the countershaft, shift gear members on said drive and driven shafts that have engagement with certain of said series of gears selectively according to adjustment of said members, means for adjusting said members separately consisting of independently movable rack-bars that have operative connections respectively with said members, each rack-bar having at its inner end a protruding tooth, a pivoted operating member having oppositely disposed toothed sectors engageable respectively with said rack-bars, and a spring-pressed finger located in the innermost end portion of each sector engageable respectively with said protruding teeth wherefore to move said bars selectively in opposite directions accordingly as said operating member is turned.

5. In a speed change gear mechanism of the type having separately movable gear shift members and gearing selectively engageable therewith, means for moving said members into selected positions, said means consisting of independently movable guided rack-bars, each having a protruding tooth, a movable operating member having toothed sectors engaging respectively said rack-bars, and spring-pressed fingers located at the inner end of said sectors respectively engageable with the protruding teeth oppositely, the arrangement being such as to cause one or the other of said rack-bars to move operatively according to the direction in which said member is moved.

6. In a speed change gear mechanism of the type having separately movable gear shift members and gearing selectively engageable therewith, means for moving said members into selected engaging positions, said means consisting of independently movable guided rack-bars, and a movable operating member having two oppositely disposed toothed sectors engageable respectively with said rack-bars adapted to selectively actuate same according to the direction in which said member is moved.

CLYDE D. BUCK.